United States Patent
Cimini, Jr. et al.

(10) Patent No.: US 8,121,103 B2
(45) Date of Patent: *Feb. 21, 2012

(54) ADAPTIVE MAC FRAGMENTATION AND RATE SELECTION FOR 802.11 WIRELESS NETWORKS

(75) Inventors: Leonard Joseph Cimini, Jr., Howell, NJ (US); Zoran Kostic, Holmdel, NJ (US); Kin K Leung, Edison, NJ (US); Hujun Yin, Bethlehem, PA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/932,178

(22) Filed: Feb. 18, 2011

(65) Prior Publication Data

US 2011/0149770 A1    Jun. 23, 2011

Related U.S. Application Data

(63) Continuation of application No. 12/380,857, filed on Mar. 3, 2009, now Pat. No. 7,894,413, which is a continuation of application No. 10/294,854, filed on Nov. 14, 2002, now Pat. No. 7,519,030.

(60) Provisional application No. 60/332,955, filed on Nov. 19, 2001.

(51) Int. Cl.
*H04W 4/00* (2009.01)
*H04J 3/24* (2006.01)
*G06F 15/16* (2006.01)

(52) U.S. Cl. .......... 370/338; 370/473; 709/228

(58) Field of Classification Search .......... 370/230–236, 370/464, 278, 468, 470–471, 473–474; 709/225, 709/228, 232–235
See application file for complete search history.

(56) References Cited

U.S. PATENT DOCUMENTS

| | | | | |
|---|---|---|---|---|
| 5,541,955 A | * | 7/1996 | Jacobsmeyer | 375/222 |
| 6,236,647 B1 | * | 5/2001 | Amalfitano | 370/335 |
| 6,246,693 B1 | * | 6/2001 | Davidson et al. | 370/445 |
| 6,418,477 B1 | * | 7/2002 | Verma | 709/240 |
| 6,909,693 B1 | * | 6/2005 | Firoiu et al. | 370/235 |
| 6,937,573 B2 | * | 8/2005 | Chan et al. | 370/252 |

* cited by examiner

*Primary Examiner* — Michael Thier

(57) ABSTRACT

A method for setting and adjusting MAC fragmentation threshold for IEEE 802.11 networks operating at different data rates is presented. The fragmentation threshold is adjusted based on throughput performance, delay constraints and hidden node influence.

20 Claims, 12 Drawing Sheets

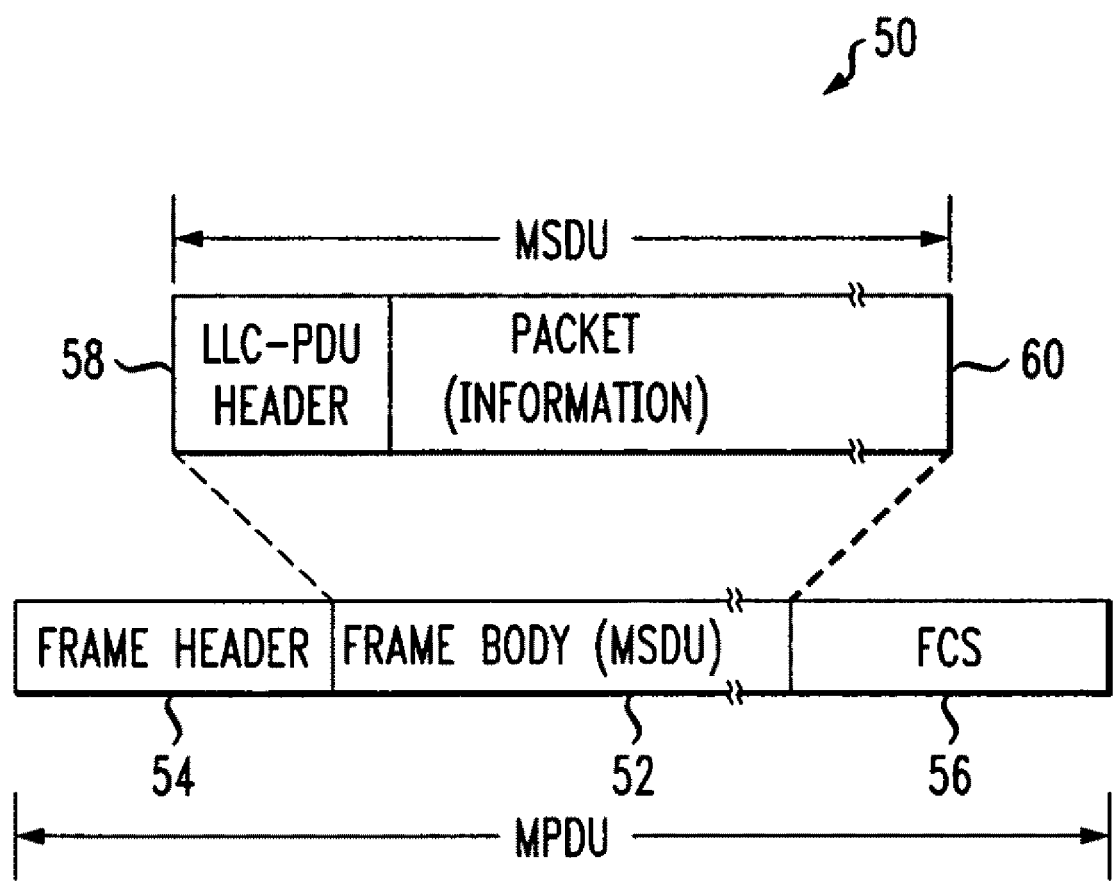

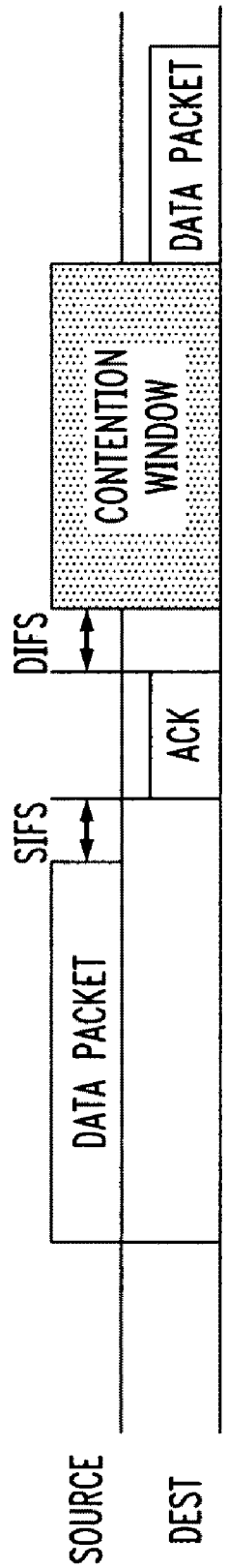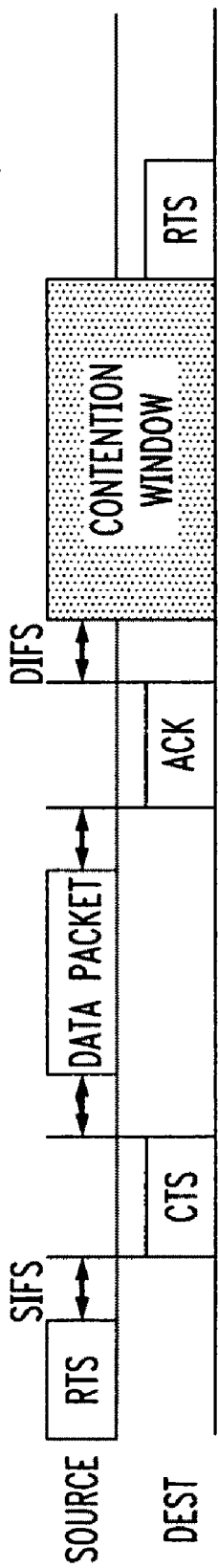

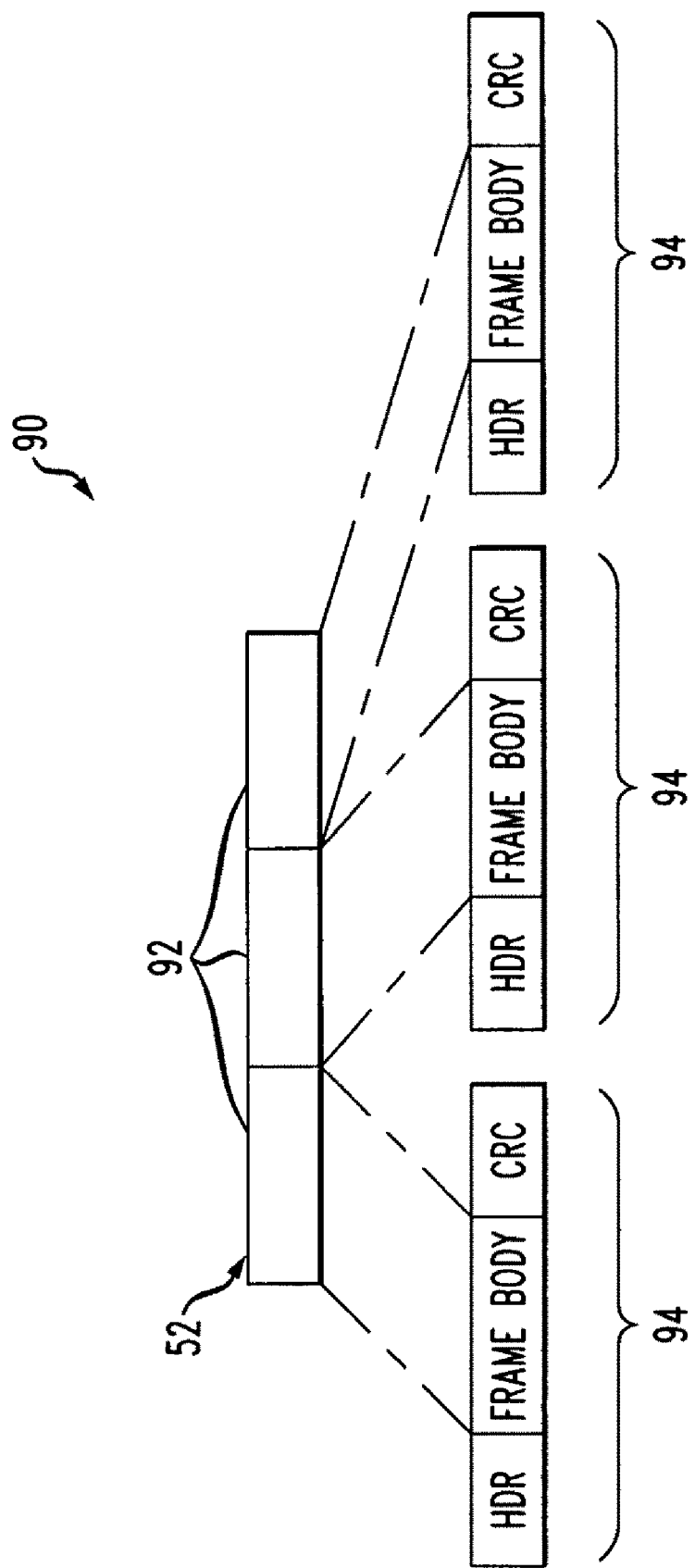

FIG. 7A

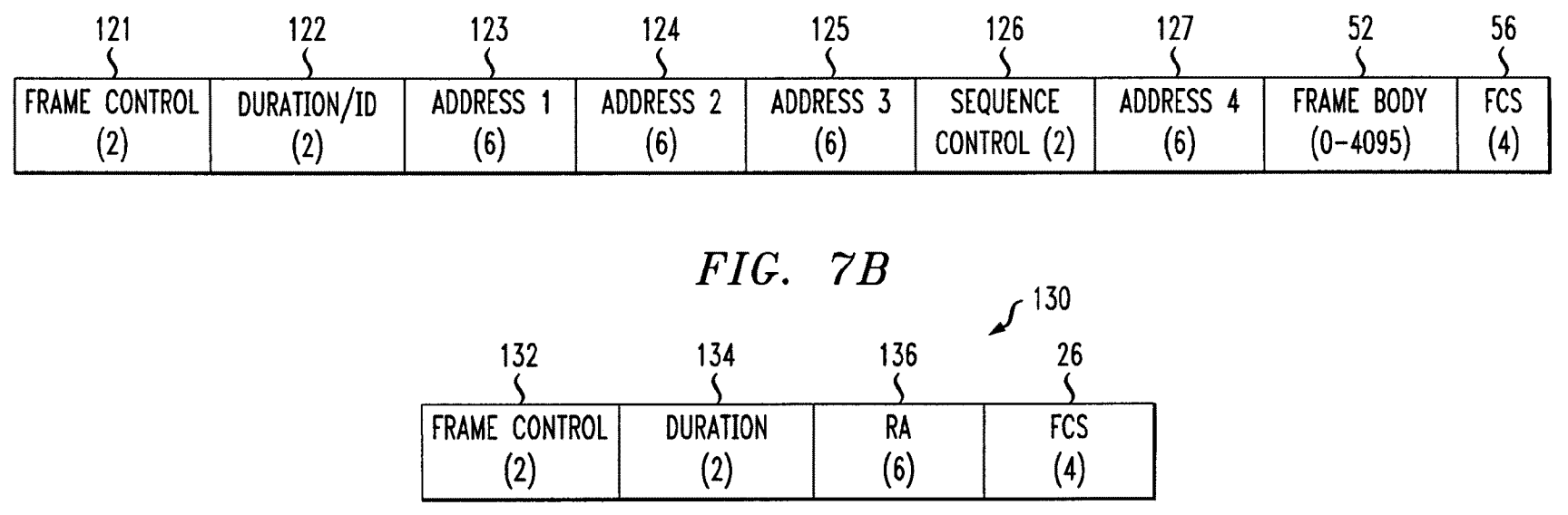

| FRAME CONTROL (2) | DURATION/ID (2) | ADDRESS 1 (6) | ADDRESS 2 (6) | ADDRESS 3 (6) | SEQUENCE CONTROL (2) | ADDRESS 4 (6) | FRAME BODY (0-4095) | FCS (4) |
|---|---|---|---|---|---|---|---|---|
| 121 | 122 | 123 | 124 | 125 | 126 | 127 | 52 | 56 |

| FRAME CONTROL (2) | DURATION (2) | RA (6) | FCS (4) |
|---|---|---|---|
| 132 | 134 | 136 | 26 |

⟵ 130

ADAPTIVE MAC FRAGMENTATION AND RATE SELECTION FOR 802.11 WIRELESS NETWORKS

CROSS REFERENCE TO RELATED APPLICATIONS

This is a continuation of U.S. patent application Ser. No. 12/380,857 filed Mar. 3, 2009, now U.S. Pat. No. 7,894,413 issued Feb. 22, 2011, which was a continuation of U.S. patent application Ser. No. 10/294,854 filed Nov. 14, 2002, now U.S. Pat. No. 7,519,030 issued Apr. 14, 2009, which claimed the benefit of U.S. provisional patent application Ser. No. 60/332,955, filed Nov. 19, 2001, which is incorporated herein by reference in its entirety for all purposes.

BACKGROUND

The invention relates generally to IEEE 802.11 wireless networks and, more particularly, medium access protocol for multi-rate IEEE 802.11 wireless networks.

In wireless networks, packets may be corrupted or lost due to various factors, such as path loss, fading and interference. While wireless local area networks (WLANs) conforming to the IEEE 802.11 standard support variable length packets, longer packets may be subject to larger probability of error. The standard defines a process called fragmentation, which produces smaller fragments out of an original frame. Fragmentation increases reliability by increasing the probability of successful transmission of the fragments in cases where channel characteristics limit reception reliability for longer frames. When a frame is received with a length greater than a given fragmentation threshold, the frame is fragmented. In conventional WLANS, the fragmentation threshold is set network-wide. Consequently, when an IEEE 802.11 network supports multi-rate communications, packets with the same size may require different transmit durations at different data rate modes.

SUMMARY

In one aspect of the invention, a method of determining a fragmentation threshold for use in nodes of a wireless includes receiving one or more packet transmissions from a transmitting node, the packet transmissions including fragments based on a fragmentation threshold value set at the transmitting node for a given data rate. The method further includes producing a signal-to-noise ratio value and a probability in error value based on the received one or more packet transmissions, and determining an optimal combination of new fragmentation threshold value and data rate value based on the determined signal-to-noise ratio and probability in error values.

Particular implementations of the invention may provide one or more of the following advantages. The fragment threshold determination mechanism advantageously decides the optimal fragmentation threshold for a given data rate. Fragmentation overhead, packet retransmissions and goodput performance are considered in the optimal fragmentation threshold selection. The mechanism can also use adaptive data rate selection to provide for an optimal rate-fragmentation combination.

Other features and advantages of the invention will be apparent from the following detailed description and from the claims.

BRIEF DESCRIPTION OF THE DRAWINGS

FIG. 3 is a depiction of an exemplary format of a MAC Protocol Data Unit (PDU).

FIGS. 4A and 4B are timing diagrams illustrating operation according to basic Distributed Coordination Function (DCF) and DCF with Request-to-Send (RTS)/Clear-to-Send (CTS), respectively.

FIG. 5 is a depiction of MAC Service Data Unit (MSDU) fragmentation.

FIGS. 7A and 7B are depictions of exemplary formats of a data frame and an ACK frame, respectively.

Like reference numerals will be used to represent like elements.

DETAILED DESCRIPTION

Figure 1A:
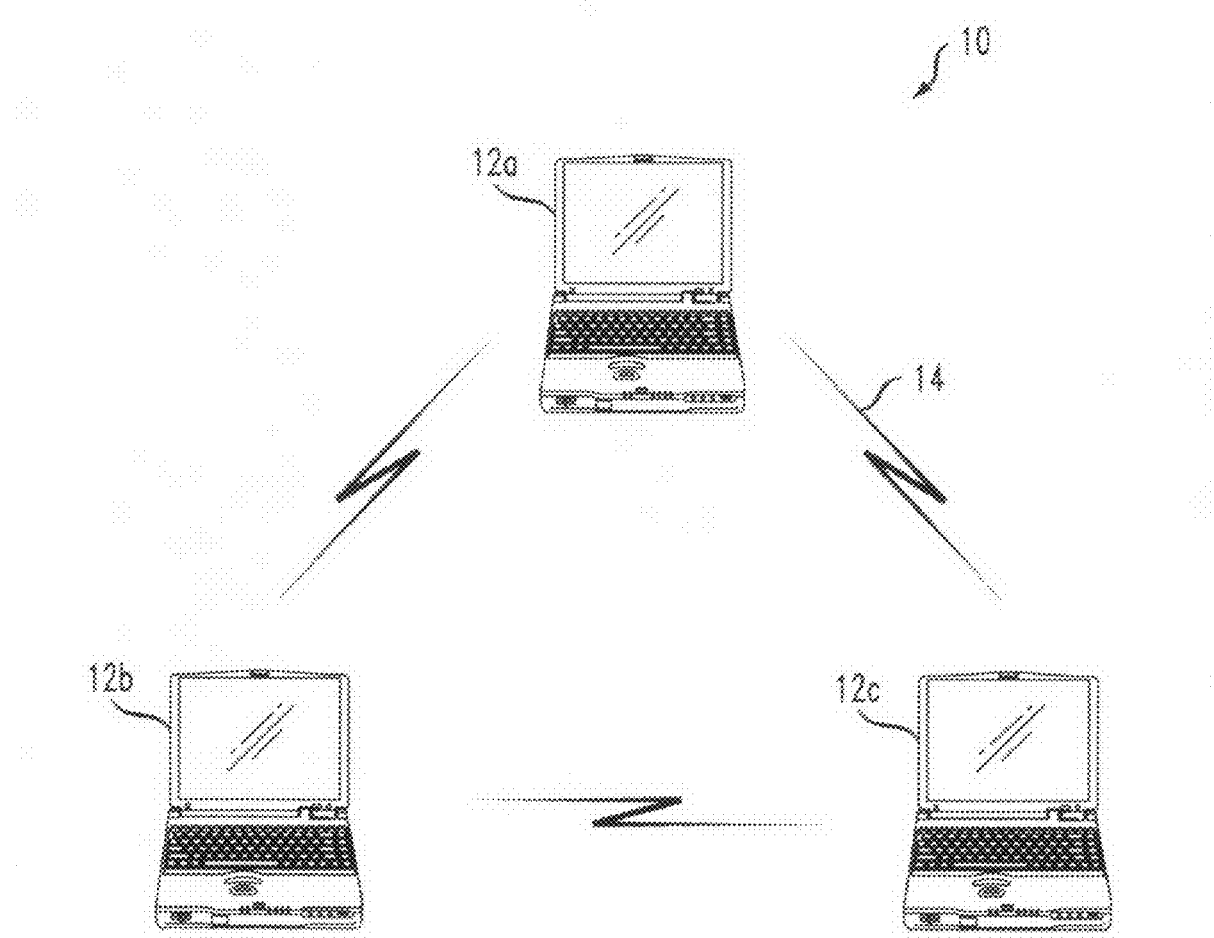
FIGS. 1A and 1B are diagrams of exemplary IEEE 802.11 wireless networks with network nodes arranged to form an infrastructure basic service set and an independent basic service set, respectively, the nodes configured to employ a fragmentation threshold determination mechanism that can adjust the fragmentation threshold dynamically.

Referring to FIG. 1, a wireless network 10 includes two or more wireless network nodes 12, e.g., stations (or terminals) 12a, 12b and 12c, arranged in a peer-to-peer configuration referred to as an independent basis service set (IBSS). During a communication between at least two of the network nodes 12 over a wireless transmission medium (indicated by reference numeral 14), a first network node, for example, network node 12a, serves as a transmitting network node (or transmitter) and at least one second network node, for example, network node 12b, serves as a receiving network node (or receiver).

Figure 1B:
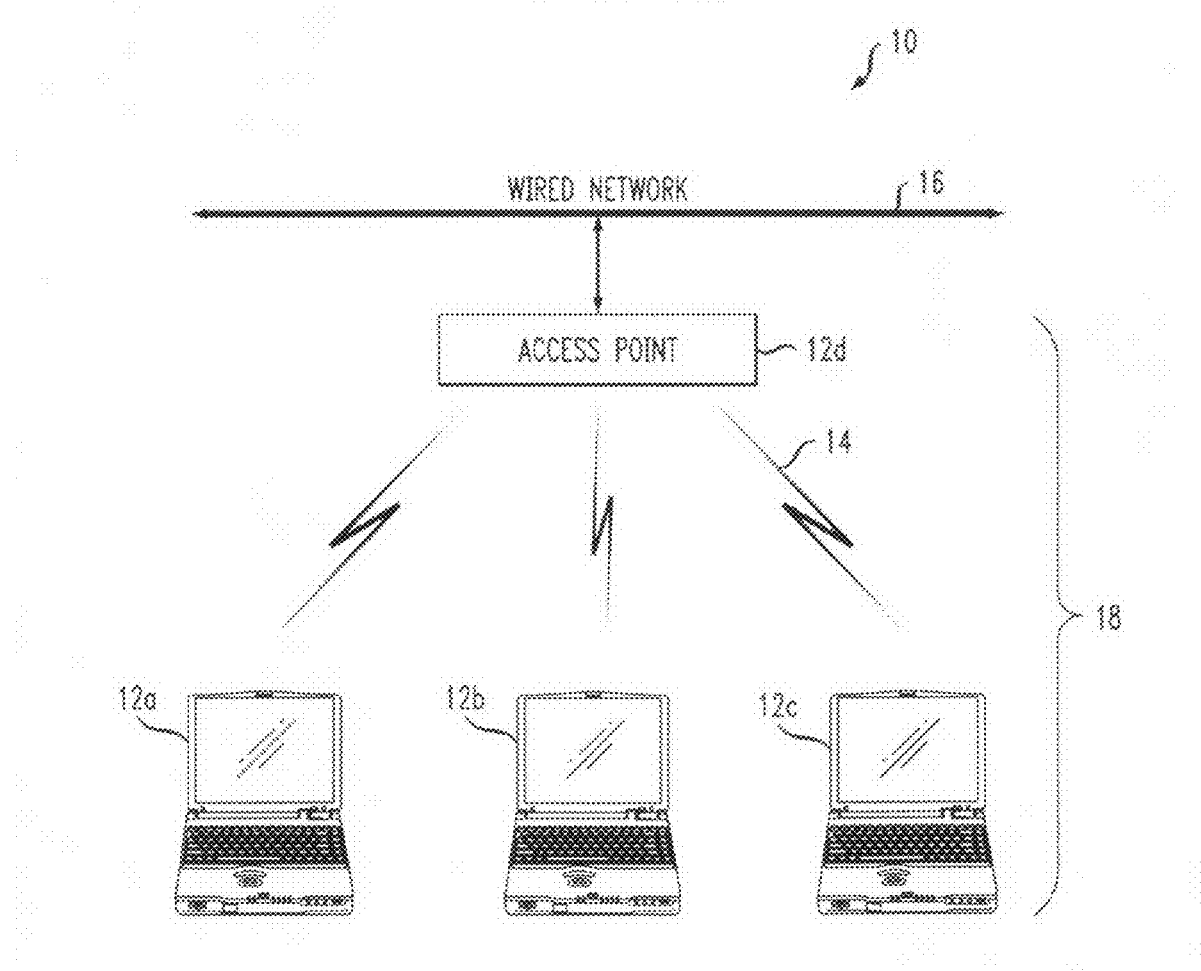

In another embodiment of the wireless network 10, as shown in FIG. 1B, the nodes 12 can include a wireless access point 12d that couples the stations 12a-12c to a wired network (e.g., a Local Area Network or "LAN") 16. In this arrangement, the stations 12a-12c are associated with the AP 12d to form an infrastructure basic service set (BSS) 18. The AP 12d and stations 12a-12c served by the AP 12d in a given infrastructure BSS (or cell) 18 communicate with each over a common channel that is assigned to the AP. Although not shown, it will be appreciated that the wireless network 10 could include one or more of both types of configurations, that is, the IBSS and infrastructure BSS configurations.

In the embodiments described herein, the nodes in the wireless network 10 communicate with each other according to the wireless protocol provided by the IEEE 802.11 standard. The IEEE 802.11 standard specifies the medium access control (MAC) and the physical (PHY) characteristics for WLANs. The IEEE 802.11 standard is defined in International Standard ISO/IEC 8802-111, "Information Technology-Telecommunications and Information Exchange Area Networks," 1999 Edition, which is hereby incorporated by reference in its entirety. In one embodiment, in particular, the network nodes 12 operate according to different data rates.

Figure 2:
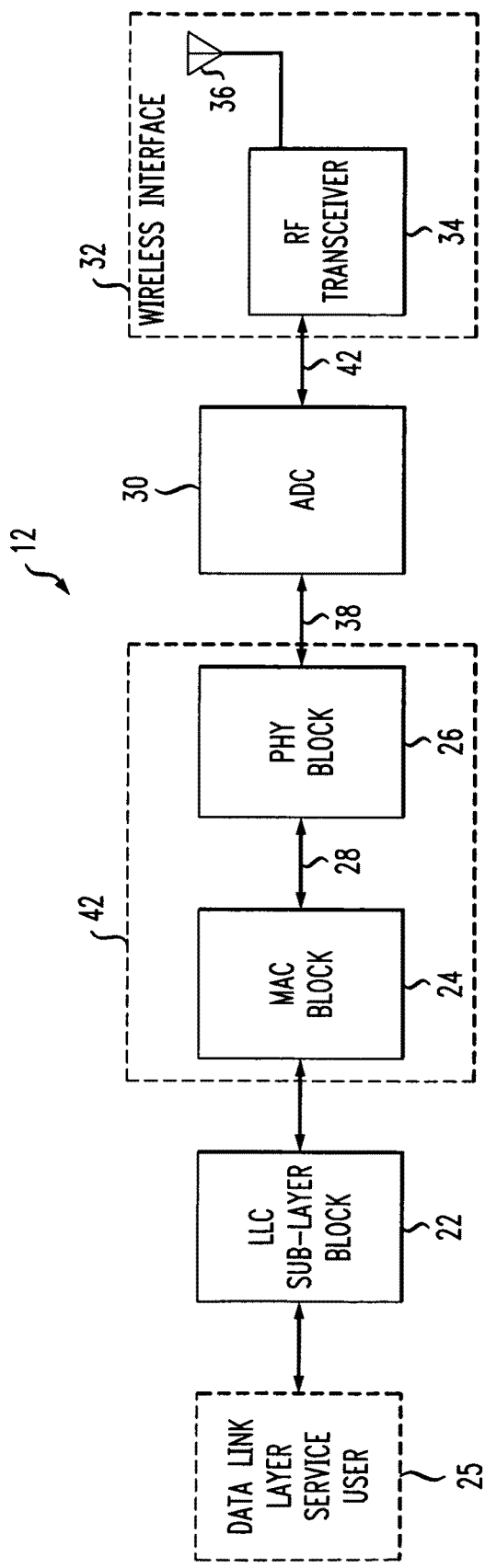
FIG. 2 is a block diagram of an exemplary one of the network nodes (shown in FIGS. 1A-1B).

Referring to FIG. 2, an exemplary network node 12 includes a number of different functional blocks. Those functional blocks include a LLC sublayer block 22 and a media access control sublayer (MAC) block 24, which connects to a data link layer service user (indicated in dashed lines by reference numeral 25), a physical layer (PHY) block 26 connected to the MAC block 24 by a MAC-to-PHY I/O bus 28, an analog front end unit or ADC 30 for digital to analog conversion and a wireless interface 32. The wireless interface 32 includes an RF transceiver 34 and an antenna 36 coupled to the RF transceiver 34. The ADC unit 30 connects to the PHY block 26 by ADC I/O lines 38, as well as connects to the RF transceiver 34 by an ADC-to-transceiver interface 40. Typically, each RF transceiver 34 includes its own receiver for receiving wireless RF communications from a terminal, a transmitter for transmitting wireless RF communications to a terminal, and a microprocessor to control the transceiver. Wireless communications are received and transmitted by each RF transceiver 34 via its respective antenna 36. Each transceiver 34 and antenna 36 may be conventional in configuration and operation.

The network node 12 can include the data link layer service user 25 or be coupled to an external data link layer service user 25. The data link service user 25 is intended to represent any device that uses the blocks 20, 26, 30 and 32 to communicate with any other node on the wireless network 10, or other network to which the wireless network 10 may be connected. The blocks 20, 26, 30, 32 and (optionally) 25 may reside in a single system "box", for example, a desktop computer with a built-in network interface, or may reside in separate boxes, e.g., blocks 24, 26, 30 and 32 could reside in a separate network adapter that connects to a host. The functionality of blocks 24 and 26 may be integrated in a single MAC/PHY transceiver 42, as indicated in the figure. Thus, each node 12 represents any combination of hardware, software and firmware that appears to other nodes as a single functional and addressable entity on the network.

Preferably, the data link layer and PHY blocks conform to the Open System Interconnect (OSI) Model. The data link block 20, in particular, the MAC block 24, performs data encapsulation/decapsulation, as well as media access management for transmit (TX) and receive (RX) functions. Preferably, the MAC block 24 employs a collision avoidance medium access control scheme like carrier sense multiple access with collision avoidance (CSMA/CA) as described by the above-referenced IEEE 802.11 standard. The MAC block 24 also provides Automatic Repeat request (ARQ) protocol support. The PHY block 26 performs transmit encoding and receive decoding, modulation/demodulation, among other functions. In the described embodiment, the operation of the PHY block 26 conforms to the IEEE 802.11a standard.

The unit of communication exchanged between nodes over the wireless medium 14 is in the form of a PHY protocol data unit ("PPDU"). The PPDU may include a payload, i.e., the MAC frame or PDU, in conjunction with a delimiter of preamble and frame control information. A MAC Service Data Unit (MSDU) refers to any information that the MAC block has been tasked to transport by upper protocol layers (e.g., OSI layers to which the OSI MAC layer provides services), along with any management information supplied by the MAC block.

FIG. 3 shows a format of a MAC PDU (MPDU) 50, which is provided by the MAC block 24 to the PHY block 26. The MPDU 50 includes a variable length body 52 encapsulated by an MPDU header 54 and a Frame Check Sequence (FCS) 56. The body 52 corresponds to the MSDU, and includes the header of the LLC PDU 58 and a packet (information or user data) 60. As will be discussed later with reference to FIGS. 11 and 12, the MPDU 50 may have the capacity to contain an entire MSDU 52 or only a fragment of the MSDU 52.

Preferably, the MAC block 24 supports standard MAC functions, such as framing, as well as ensures Quality of Service and provides for reliable frame delivery through a number of different mechanisms. Also, ARQ is used to ensure delivery for unicast transmissions. A correctly addressed frame with a valid PHY frame Check Sequence causes the receiver to transmit a positive acknowledgment (or "ACK") response to the originator. Transmitting nodes attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response, that is, no ACK, NACK, FAIL or other defined response types not discussed herein, is received when one is expected.

The IEEE 802.11 standard provides detailed medium access control (MAC) and physical layer (PHY) specification for WLANs. The IEEE 802.11a PHY has been developed to extend the existing IEEE 802.11 standard in the 5 GHz U-NII bands. The 802.11a PHY is based on Orthogonal Frequency Domain Multiplexing (OFDM) radio, which provides eight different PHY modes with data rates ranging from 6 Mbps to 54 Mbps. The 8 PHY modes are shown in Table 1 below.

TABLE 1

| Mode | Coding | Modulation | Bits/Symbol | Data Rate |
| --- | --- | --- | --- | --- |
| 1 | 1/2 | BPSK | 24 | 6M |
| 2 | 3/4 | BPSK | 36 | 9M |
| 3 | 1/2 | QPSK | 48 | 12M |
| 4 | 3/4 | QPSK | 72 | 18M |
| 5 | 1/2 | 16QAM | 96 | 24M |
| 6 | 3/4 | 16QAM | 144 | 36M |
| 7 | 2/3 | 64QAM | 192 | 48M |
| 8 | 3/4 | 64QAM | 216 | 54M |

In addition to the use of multiple modulation schemes, convolutional codes with variable rates are adopted to improve the frame transmission reliability as well as the data rate.

In the IEEE 802.11 MAC, the fundamental mechanism to access the medium is called Distributed Coordination Function (DCF). It achieves medium sharing through the use of CSMA/CA with random backoff. The nodes 12 follow two medium access rules. First, a node is allowed to transmit only if its carrier sense mechanism determines that the medium has been idle for at least the distributed interframe space (DIFS) time. Second, the node selects a random backoff interval (contention window) after access deferral or prior to attempting to transmit again immediately after a successful transmission.

Referring to FIGS. 4A and 4B, the DCF employs two types of mechanisms for packet transmission. One mechanism is a basic DCF access scheme and uses a two-way handshaking technique 70, shown in FIG. 4A. This technique uses an immediate transmission of a positive acknowledgement (ACK) by the destination station, upon successful reception of a packet from sender. Referring to FIG. 4B, in addition to the basic access, an optional mechanism that uses a four-way handshaking technique 80 referred to as DCF with Request to Send (RTS)/Clear to Send (CTS) has been standardized. Before transmitting a PPDU with packet data (referred to herein as a data packet), a node operating in RTS/CTS mode "reserves" the channel by sending a special RTS frame. The destination, having received the RTS and waited a short interframe spacing (SIFS) time, acknowledges the receipt of an RTS by sending back a CTS frame. A data packet transmission and ACK follow, spaced by the appropriate SIFS (as shown in FIG. 4B). The RTS/CTS scheme increases network performance by reducing the duration of a collision when long messages are transmitted. Also, the RTS/CTS scheme is suited to combat the well-known "hidden node" problem. The RTS/CTS is a natural choice for adaptive coding/modulation because the RTS/CTS pair can exchange channel information before the data packet transmission begins so that accurate rate adaptation can occur.

The DCF adopts an exponential backoff scheme. At each packet transmission, the backoff time is uniformly chosen in the range (0, w−1). The value "w" relates to a contention window and depends on the number of transmission failed for the packet. At the first transmission attempt, w is set equal to a minimum contention window value "aCWmin". After each unsuccessful transmission, w is doubled, up to a maximum value "aCWmax". The backoff timer is decremented as long as the channel is sensed idle, "frozen" when a transmission is detected on the channel, and reactivated when the channel is sensed idle again for more than a DIFS. The node transmits when the backoff time reaches zero. As can be seen from FIGS. 4A-4B, in order to transmit a data packet successfully, some overheads such as PHY overhead, ACK and backoff are added. As the data rate increases, such overhead is relatively constant. Thus, the overhead becomes significant for high rate links.

As mentioned above, the MAC block 24 supports fragmentation, the process of partitioning a MSDU or a MAC management protocol data unit (MMPDU) into smaller MPDUs. Fragmentation improves chances of frame delivery under poor channel conditions. Thus, an MSDU arriving at the MAC block 24 may be placed in one or more MPDU fragments depending on the size of the MSDU.

FIG. 5 illustrates a fragmentation mechanism 90 in which an MSDU 52 is partitioned into multiple MDSU portions 92. The multiple MSDU portions 92 are encapsulated in multiple fragments 94.

When a MSDU is received from the LLC sublayer block 22 or a MMPDU is received from the MAC sublayer management entity (not shown) with a length greater than the fragmentation threshold, the MSDU or MMPDU is fragmented. The MPDUs resulting from the fragmentation of an MSDU or MMPDU are sent as independent transmissions, each of which is separately acknowledged. This permits transmission retries to occur per fragment, rather than per MSDU or MMPDU.

Figure 6A:
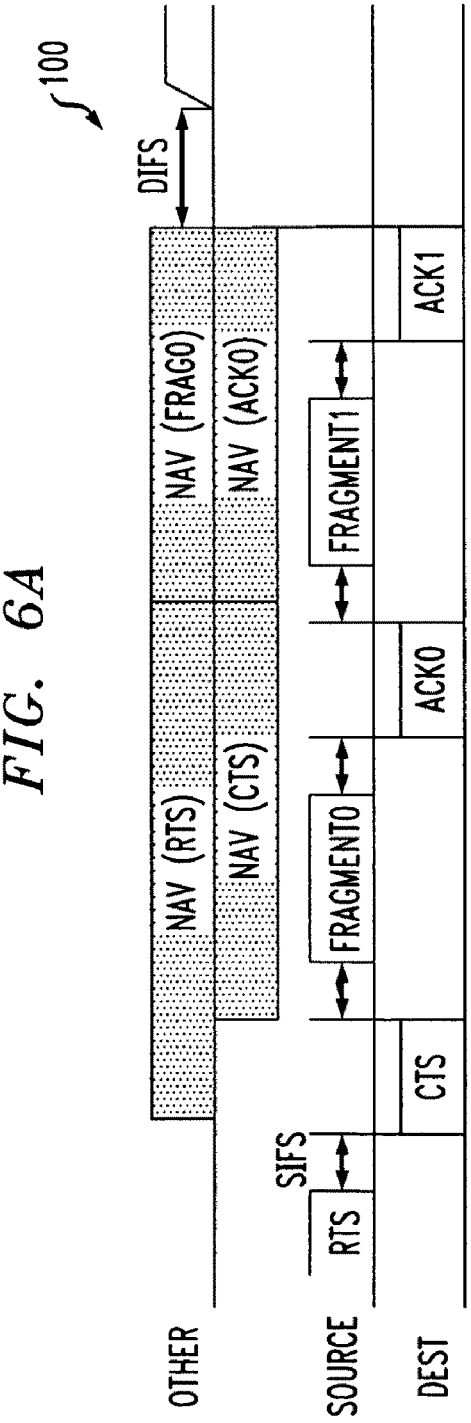
FIGS. 6A and 6B are timing diagrams illustrating successful fragment transmission and failed fragment transmission, respectively.
Figure 6B:
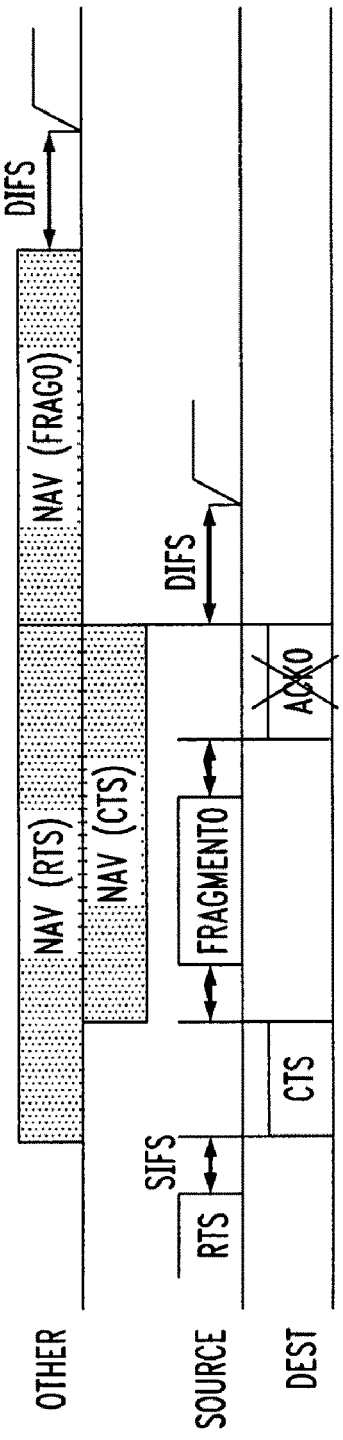

FIGS. 6A and 6B show the use of RTS/CTS for frame fragments. In particular, FIG. 6A shows a standard (successful) MAC fragment transmission 100 in which fragments transmit consecutively, with each fragment separately acknowledged. Each frame contains information that defines the duration of the next transmission. The duration information from RTS frames is used to update the Network Allocation Vector (NAV) to indicate busy until the end of ACK0. The duration information from the CTS frame is also used to update the NAV to indicate busy until the end of the ACK0. Both Fragment0 and ACK0 contain duration information to update the NAV to indicate busy until the end of ACK1. This update uses the Duration/ID field in the Fragment (data) and ACK frames. This updating continues until the last fragment, which has a duration of one ACK time plus one SIFS time, and its ACK, which has its Duration/ID field set to zero, are transmitted. Each fragment and ACK therefore acts as a virtual RTS/CTS. No further RTS/CTS frames need to be generated after the initial RTS/CTS that began the frame exchange sequence.

FIG. 6B shows a failed fragment transmission 110. In illustrated case where an acknowledgment is sent but not received by the source node, nodes that heard the Fragment0 or ACK0 mark the channel busy for the next frame exchange due to the NAV having been updated from these frames. The source node has to contend for the channel again and retransmit the fragment in error. If an acknowledgment is not sent by the destination node, nodes that can only hear the destination node do not update their NAV and may attempt to access the channel when their NAV update from the previously received frame reaches zero. All nodes that hear the source node are free to access the channel after their NAV updated from the transmitted fragment has expired.

The impact of MAC/PHY/retransmission overheads on network system performance will now be considered. To simplify the analysis, it is assumed that only one node is actively transmitting. Therefore, there are no collisions on the wireless medium. In addition, it is assumed that there is no retry limit for each frame in error. Finally, it is assumed that the ACK frame is transmitted at the lowest possible rate.

All of the fields that contribute to the MAC overhead for a data frame are 28-34 octets in total.

FIG. 7A shows in detail the format of a data frame 120. The data frame 120 includes the following fields: Frame Control 121; Duration/ID 122; three address fields 123-125; Sequence Control 126; a fourth address 127. The data frame further includes the frame body 52 and Frame Check Sequence (FCS), shown earlier in FIG. 3. FIG. 7B shows the format of an ACK frame 130. The ACK frame 130 includes a Frame Control field 132, a Duration field 134, an RA field 136, as well as the FCS field 56.

Figure 8:
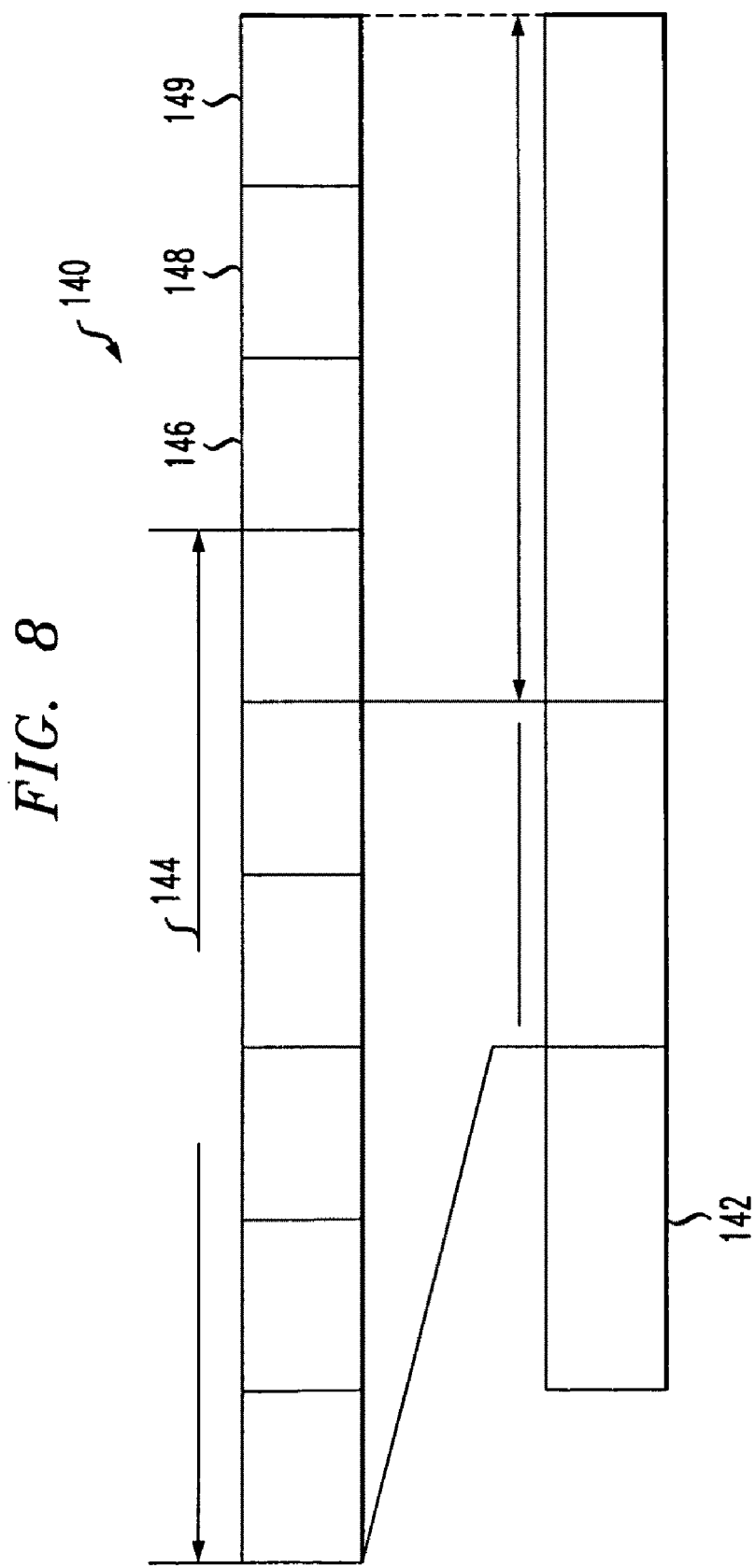
FIG. 8 is a depiction of an exemplary format of a PHY Protocol Data Unit (PPDU).

FIG. 8 shows the format of a PPDU 140. The PPDU includes an OFDM PLCP preamble 142, an OFDM PLCP header 144, PSDU 146, tail bits 148 and pad bits 149.

Base on the definition of FIGS. 7-8, for an L-octet long packet to be transmitted over the IEEE 802.11a physical layer (implemented by PHY block 26) using a PHY mode m, the transmission duration is:

$$T_m(L)=tPLCP\text{ Preamble}+tPLCP\text{Header}+[(32+L)/BpS(m)]tSymbol \qquad \text{Eq. (1)}$$

Note that the ACK is transmitted at the lowest rate, e.g. BpS(m)=3. Thus, the ACK duration is $$T_{ACK}=tPLCP\text{Preamble}+tPLCP\text{Header}+6tSymbol. \qquad \text{Eq. (2)}$$

For the two-way handshaking scheme, the whole transmission duration is $$T_{two-way}(M,L)=T_m(L)+SIFS+T_{ACK} \qquad \text{Eq. (3)}$$

while the four-way handshaking scheme requires more overhead $$T_{four-way}=T_m(L)+T_{RTS}+T_{CTS}+T_{ACK}+3SIFS \qquad \text{Eq. (4)}$$

where $T_{RTS}=T_{ACK}+2tSymbol$ and $T_{CTS}=T_{ACK}$.

Also because there is no collision, the backoff window is always aCWmin. The backoff timer does not start until the previous transmission ended for DEFS. Therefore, the average idle time between two successive transmissions is $$I_{avg}=DIFS+(aCW\min)/2aSlotTime. \qquad \text{Eq. (5)}$$

The average goodput can be approximated by $$G_{two-way}(m)=[8L/(I_{avg}+T_{two-way})]P_m(L) \qquad \text{Eq. (6)}$$

and $$G_{four-way}(m)=[8L/(I_{avg}+T_{four-way})]P_m(L), \qquad \text{Eq. (7)}$$

where $P_m(L)$ is the probability of successful transmission of an L-octets packet at PHY mode m. The term "goodput" refers to the effective throughput seen by the user.

Fragmentation of a given MSDU may incur a large overhead. On the other hand, deferring fragmentation to very large MSDUs may waste more bandwidth due to transmission errors that are more likely to occur in large MSDUs. Given the IEEE 802.11 MAC and PHY overhead, together with the SIFS intervals and ACK, the effective transmission time of one fragment is $$T_{frag}(L) = T_{pl} + T_{ovhd} = T_m(L) + T_{ACK} + 2SIFS. \quad \text{Eq. (8)}$$

The payload transmission time is $$T_{pl}(L) = [L/BpS(m)]tSymbol \quad \text{Eq. (9)}$$

and the overhead transmission time is $$T_{ovhd} = 2SIFS + T_{ACK} + tPLCPPreamble + tPLCPHeader + [32/BpS(m)]tSymbol \quad \text{Eq. (10)}$$

or, approximately, $$(24 + [32/BpS(m)])tSymbol.$$

For a number of fragments "N" of a packet of length L, therefore, the goodput is $$G(L,N) = [T_{pl}(L/N)] / [T_{frag}(L/N) + I_{avg}]RP(L/N,R). \quad \text{Eq. (11)}$$

Thus, optimal fragment size can be found to maximize goodput according to above equation. It is a function of the code rate and channel SNR.

Figure 9:
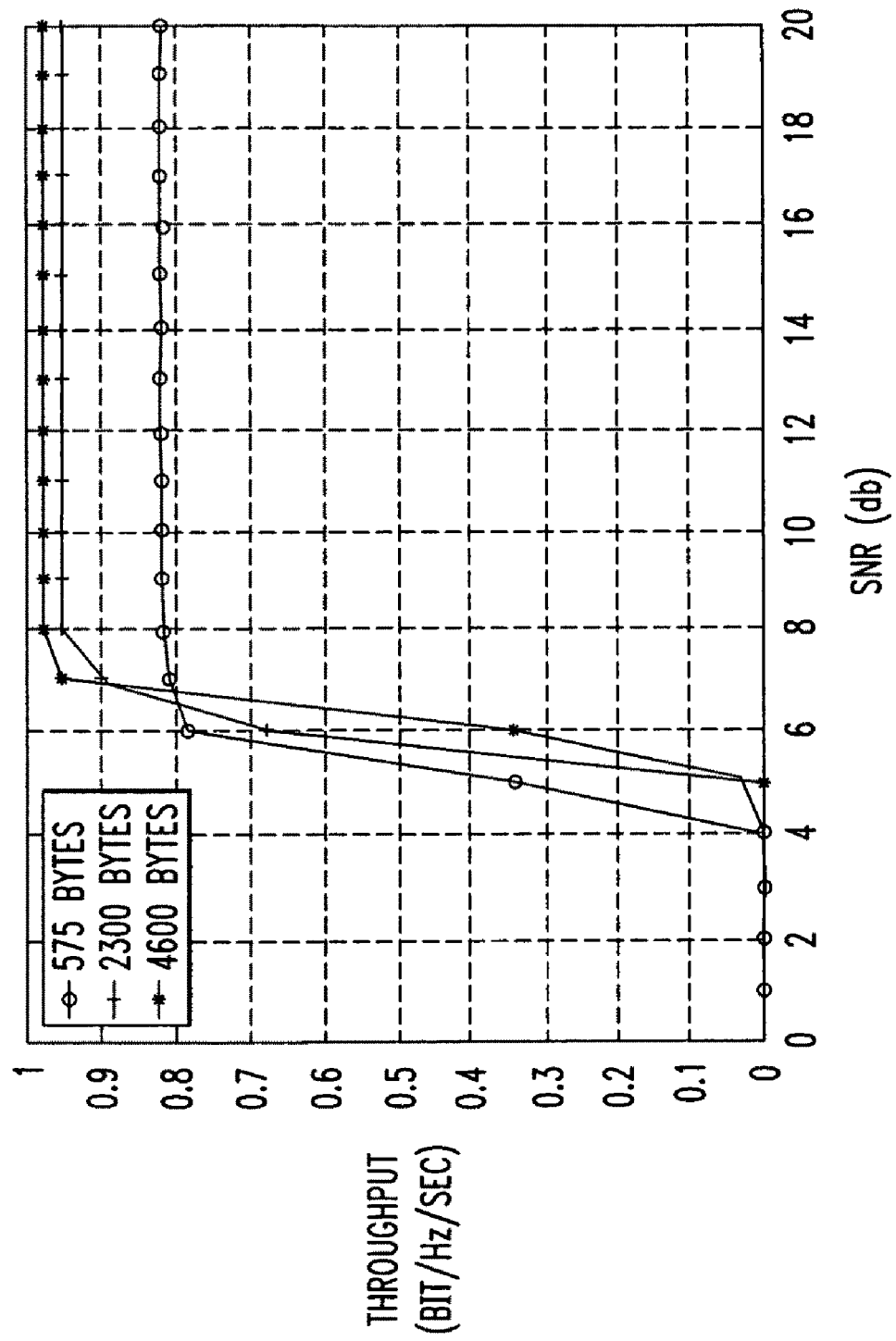
FIGS. 9 and 10 are graphical depictions of throughput as a function of SNR for different fragment sizes using data rates of PHY node 3 and PHY mode 6, respectively.
Figure 10:
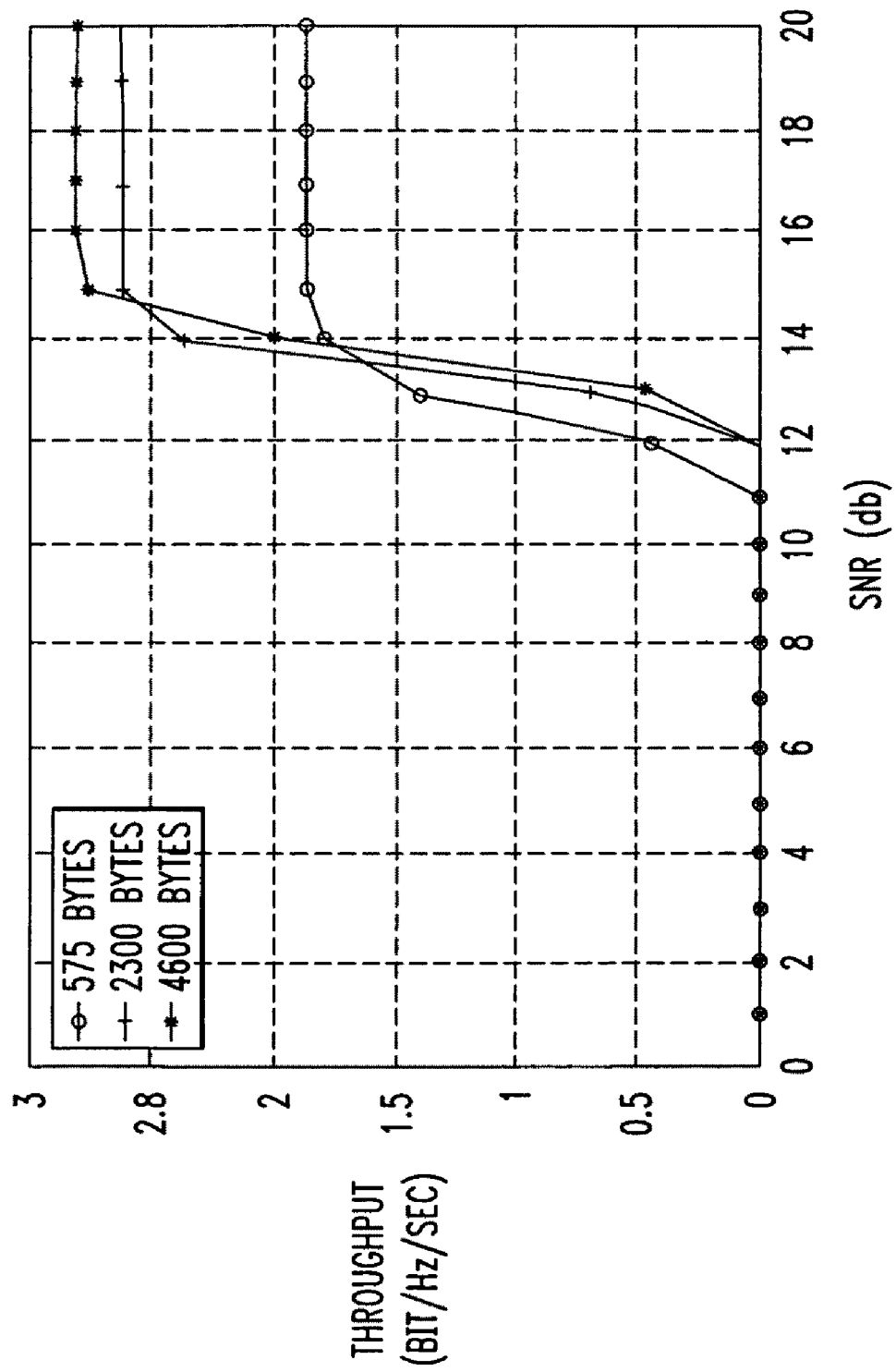
Figure 11:
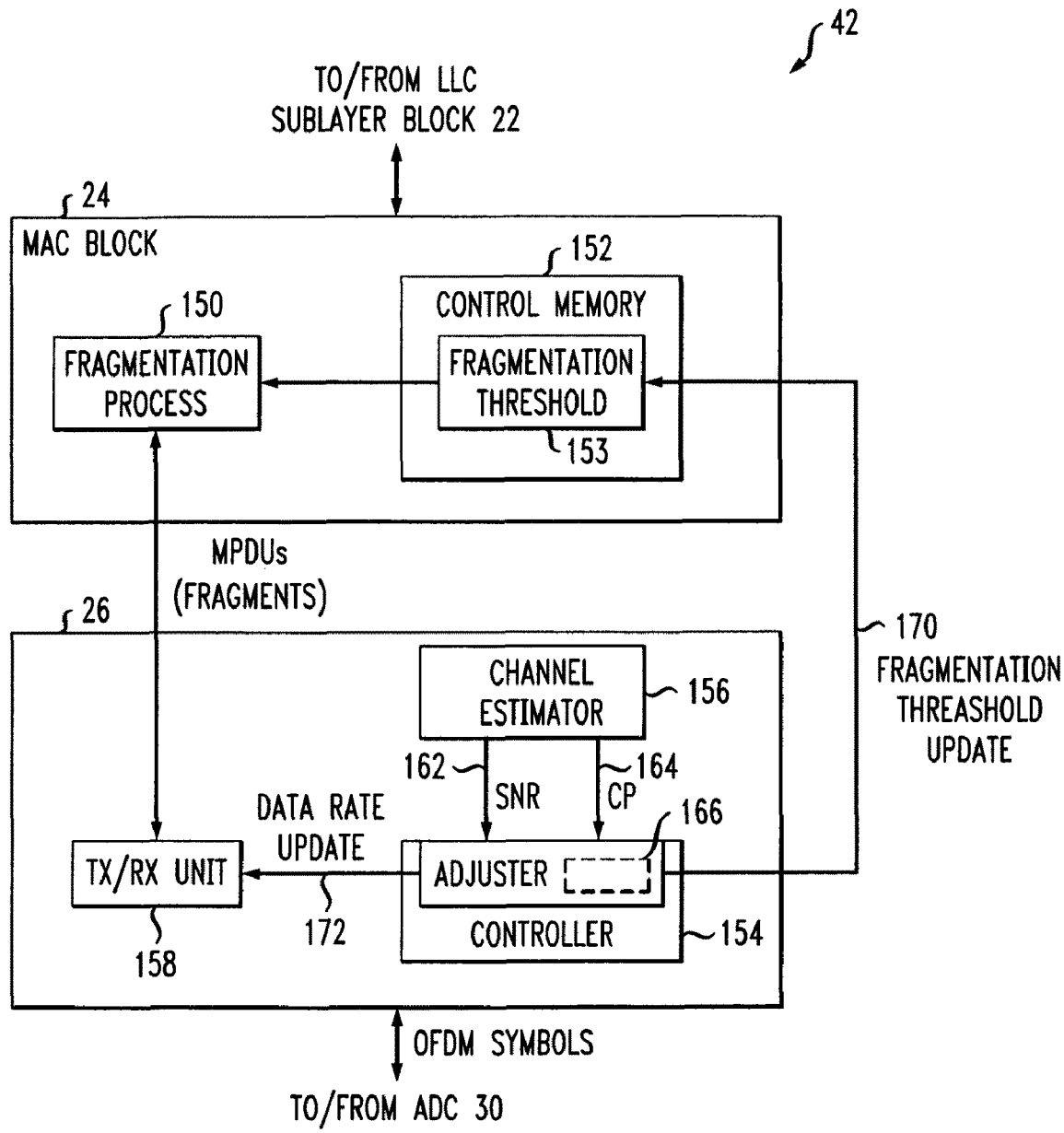
FIG. 11 is a block diagram of the MAC/PHY transceiver (from FIG. 2) configured to perform dynamic fragmentation threshold adjustment.

FIGS. 9-11 illustrate the robustness of fragmentation against spectrum efficiency. For the eight rate modes available, the benefit of fragmentation is rather limited in additive white Gaussian noise (AWGN) channels. FIG. 9 shows the throughput of IEEE 801.11a Mode 3 (QPSK modulation with ½-rate coding) with different fragment sizes. It can be seen that a smaller fragment size results in fragments with better packet error rate (PER), but the fragmentation causes significant overhead. For example, a fragment size of 575 octets may cause up to 20% of throughput loss in comparison with a fragment size of 4600 octets. With higher rate coding/modulation, the loss is even greater because of the coding/modulation invariant overhead. As shown in FIG. 10, the loss is about 40% for IEEE 802.11 Mode 6 (16QAM modulation with ¾-rate coding). The results show that it is desirable to use large fragments if SNR permits. Because of the lower PER of the smaller fragment, however, there is usually 2-3 db SNR margin with some throughput tradeoff. Thus, the fragment size can be reduced when SNR is marginal to guarantee a smooth transition. Results for throughput of adaptive coding/modulation with variable fragment sizes (not shown) suggest that the dominant factor for throughput is the code rate and that the fragment size can provide some fine tuning for a given code rate.

Another function of fragmentation is to avoid hidden node influence by reducing the fragment size. If one node is under the influence of a hidden node, the frames sent to it will be lost and must be retransmitted. It is assumed that the probability that the period of time "T" that a node is under hidden node influence is $P_h$. As the minimal fragment transmission time is '26-35tSymbol' depending on the data rate, then $P_h$ is defined as the probability of hidden terminal influence during 25tSymbol time period $T_h$. For a fragment transmission time $NT_h$, its probability in error because of hidden terminal is $P_f = 1-(1-P_h)^N$. The longer the packet length, the larger the probability that the node is corrupted by hidden nodes. Also, because $P_h$ is associated with transmission time, different data rates can affect $P_f$. Table 3 shows payload transmission time in terms of symbols, more specifically, the number of OFDM symbols required to transmit 1 Kbytes of data and 4 Kbytes of data at different rate modes.

TABLE 2

|  | 6 Mbps | 9 Mbps | 12 Mbps | 18 Mbps | 24 Mbps | 36 Mbps | 48 Mbps | 54 Mbps |
|---|---|---|---|---|---|---|---|---|
| 1023 octets | 341 | 228 | 171 | 114 | 86 | 64 | 43 | 38 |
| 4095 octets | 1365 | 910 | 683 | 455 | 342 | 256 | 171 | 152 |

Transmission time can be divided by $T_h$ to give payload transmission time in terms of $T_h$, as shown below in Table 3.

TABLE 3

|  | 6 Mbps | 9 Mbps | 12 Mbps | 18 Mbps | 24 Mbps | 36 Mbps | 48 Mbps |
|---|---|---|---|---|---|---|---|
| 1023 octets | 14 | 9 | 7 | 5 | 3 | 3 | 2 |
| 4095 octets | 55 | 36 | 27 | 18 | 14 | 10 | 7 |

From Table 3 it can seen that, for the high end of the data rate modes (>18 Mbps), the packet transmission time is not significantly larger than the fixed overhead. Thus, fragmentation would not provide much protection over hidden nodes no matter what fragmentation size was used. Since a large overhead could be imposed by fragmentation, it may be best to forego fragmentation for these rate modes. Considering the low rate end, however, it could be helpful to do fragmentation for packets larger than 1K bytes.

Only the impact of fragmentation on goodput performance has been considered so far. Another important performance parameter is packet delay. However, packet delay depends on the activities of the other nodes. When a transmission is in error, it has to be retransmitted. Retransmission requires that node again contend for access to the medium with other nodes. The time duration between two successive transmissions can be the major part of the delay. While it is difficult to determine such inter-transmission waiting time, it is possible to limit the node's packet retransmission probability to avoid excessive packet delay. Once again, the rate adaptation and fragmentation are possible tools to adjust the packet error rate. For the system with N fragments with PER $P_N$, the expected retransmission is $$D = NP_N/(1-P_N). \quad \text{Eq. (12)}$$

The optimal rate and fragmentation size can be decided under a constraint D<Do.

From the above analysis, it can be seen that the benefit of fragmentation varies at different rate modes. So, it is possible to set different fragmentation limits at different rate modes or to not use fragmentation at all. The choice of limit should take into account such factors as SNR, hidden node influence and delay constraint.

The mechanism of the present invention therefore sets and adjusts the MAC fragmentation threshold based on the rate mode and other factors, for example, hidden terminal influence. The method determines the fragmentation threshold for each data rate. The fragmentation overhead, packet retransmissions and goodput performance are considered to select the optimal threshold.

The mechanism can also be combined with adaptive rate selection to choose the optimal rate-fragmentation combination. This is feasible because the fragmentation threshold aFragmentation is the parameter to invoke the fragmentation process.

FIG. 11 depicts an exemplary transceiver 42 that is configured to employ fragmentation threshold and rate adjustment at the MAC and PHY layers. As shown, the MAC block 24 includes a fragmentation process 150 and a control memory 152 that stores a value for fragmentation threshold (or fragment size). The fragmentation process 150 receives an MSDU from LLC sublayer block 22 and partitions the MSDU to produce multiple MPDU fragments if the MSDU size is greater than the fragmentation threshold. The MAC block 24 provides the MPDU fragments to the PHY unit 26 for transmission. The PHY block 26 includes a controller 154, channel estimator (CE) 156 and a transmit (TX)/receive (RX) unit 158. The TX/RX unit 158 operates according to the IEEE 802.11a PHY and performs such functions as FEC encoding/decoding, modulation/demodulation, IFFT/FFT and so forth. In a transmit mode, the TX/RX unit 158 produces PPDUs from the MPDU fragments and transmit the PPDUs onto the medium (via the ADC 30 and RF transceiver 34) in the form of OFDM symbols. In receive mode, the TX/RX unit 158 receives incoming OFDM symbols and provides packet data from the OFDM symbols to the MAC block 24 and packet data information to the CE 156. The packet data information can include the packet data and/or information generated or derived from the packet data by FFT or other PHY RX processing. The controller 154 controls and coordinates the activities of the TX/RX unit 158 and the CE 156. In addition, the controller includes an adjuster 160 that adaptively adjusts the fragmentation threshold (stored in the control memory 152 of a another node, that is, a transmitter node) and PHY mode data rate (also of the transmitter node) based on input received from the CE 156. In one embodiment, that input includes a SNR measurement value 162 and a value indicative of probability in error (or collision probability "CP") 164 based in the hidden node influence. The CE 156 estimates an SNR value based on channel characteristics determined from the received packet data information. The CE 156 uses ACK loss rate as indicative of collision probability. Because the ACK is transmitted at the lowest data rate, if it is lost, most likely its loss is due to collision instead of channel noise. Other techniques may be used to measure the CP as well. The CE 156 provides the SNR and CP information to the controller 154, more specifically, the selector 160, which uses the information to select an optimal combination of fragmentation threshold and data rate 166. The adjuster 160 finds the best combination by determining which combination maximizes the goodput while at the same time satisfying delay constraints. As discussed earlier, and in particular, with reference to Eq. (11), the goodput and delay constraint are functions of the parameters to be determined (that is, the data rate and the fragmentation threshold) and the measured parameters (SNR as well as CP due to hidden node interference). Given the measured parameters, to determine the optimal parameters is to check all possible data rate and fragmentation threshold combinations (e.g., 8 data rates for the 8 PHY modes and a predetermined number of fragmentation thresholds) for the combination that provides the highest goodput while also taking into account certain delay constraint, as noted earlier. Thus, the adjuster 160 can operate as a table lookup. Once the adjuster 160 determines the appropriate selection of data rate and fragmentation threshold, the new threshold fragmentation and data rate values are provided (via a control frame or some other mechanism) to the transmitter node. The controller of the transmitter node can then update the stored fragmentation threshold value 153 (initially set based on data rate) with the new value via a fragmentation update signal 170 (or, alternatively, makes the current value available to the MAC unit for such update) and provide the data rate to the TX/RX unit 158 via a data rate update signal 172. It will be appreciated that the functionality of the adjuster need not reside in the PHY unit. This function could be performed in the MAC unit or elsewhere.

Thus, fragmentation threshold and data rate adjustment can be used to achieve optimal goodput performance in an IEEE 802.11a wireless LAN. While this technique maximizes goodput performance, it can be extended to optimize other performance measurements, e.g., throughput, PER and so forth, as well. In addition, while the description above refers to constraints that are delay-related, the constraints could also be related to other factors, e.g., PER.

Other embodiments are within the scope of the following claims.

The invention claimed is:

1. A method comprising determining a fragmentation threshold value and a data rate value for packet transmission frames to be transmitted from a transmitting node to a receiving node,
    wherein the determined data rate value is a first data rate value at least when a signal-to-noise (SNR) value of packet transmissions received by the receiving node from the transmitting node is a first SNR value and is a second data rate value larger than the first data rate value when said SNR value of packet transmissions received by the receiving node from the transmitting node is larger than said first SNR value,
    wherein the determined fragmentation threshold value is a first fragmentation threshold value at least when said SNR value of packet transmissions received by the receiving node from the transmitting node is a particular SNR value and is a second, larger fragmentation threshold value when said SNR value of packet transmissions received by the receiving node from the transmitting node is larger than said particular SNR value,
    and wherein the first and second fragmentation threshold values are based on the determined data rate value.

2. The method of claim 1 wherein a fragmentation threshold value defines the frame length that, if exceeded by a frame at the transmitting node, results in partitioning of that frame into fragments that are to be independently transmitted to the receiving node, the length of the fragments being no greater than said frame length.

3. The method of claim 2 wherein said determining is carried out at the receiving node.

4. The method of claim 3 further comprising the receiving node causing the transmitting node to transmit packet transmission frames to the receiving node at the determined data rate and using the determined fragmentation threshold value in said partitioning.

5. The method of claim 4 wherein said causing the transmitting node to transmit packet transmission frames includes the receiving node transmitting the determined fragmentation threshold value and determined data rate value to the transmitting node.

6. The method of claim 2 further comprising the transmitting node transmitting packet transmission frames to the receiving node at the determined data rate and using the determined fragmentation threshold value in said partitioning.

7. The method of claim 2 wherein the determined data rate value and the determined fragmentation threshold value, in combination, maximize goodput between the transmitting node and the receiving node.

8. The method of claim 2 wherein the determined data rate value and the determined fragmentation threshold value, in combination, maximize throughput between the transmitting node and the receiving node.

9. The method of claim 2 wherein the determined data rate value and the determined fragmentation threshold value, in combination, are such that predetermined delay constraints are satisfied at the transmitting node.

10. Apparatus for use in a receiving packet network node comprising:

a controller that is adapted to determine a combination of fragmentation threshold value and a data rate value for packet transmission frames to be transmitted to the node, and means for transmitting the determined fragmentation threshold value and a data rate value to the transmitting node, wherein the determined data rate value is a first data rate value at least when a signal-to-noise (SNR) value of packet transmissions received by the receiving node from a transmitting node is a first SNR value and is a second data rate value larger than the first data rate value when said SNR value of packet transmissions received by the receiving node from the transmitting node is larger than said first SNR value, wherein the determined fragmentation threshold value is a first fragmentation threshold value at least when said SNR value of packet transmissions received by the receiving node from the transmitting node is a particular SNR value and is a second, larger fragmentation threshold value when said SNR value of packet transmissions received by the receiving node from the transmitting node is larger than said particular SNR value, and wherein the first and second fragmentation threshold values are based on the determined data rate value.

11. The apparatus of claim 10 wherein a fragmentation threshold value defines the frame length that, if exceeded by a frame at a source of the transmitted packet transmission frames, results in partitioning of that frame into fragments that are to be independently transmitted to the node, the length of the fragments being no greater than said frame length.

12. The apparatus of claim 11 wherein the combination is such as to maximize goodput between the transmitting node and the receiving node.

13. The apparatus of claim 11 wherein the combination is such as to maximize throughput between the transmitting node and the receiving node.

14. Apparatus comprising, a processor, and a non-transitory computer-usable medium having a computer readable program code embodied therein, said computer readable program code being such that when it is executed by the processor, a combination of fragmentation threshold value and data rate value for packet transmission frames transmitted from a transmitting node to a receiving node of a packet network is determined, wherein the determined data rate value is a first data rate value at least when a signal-to-noise (SNR) value of packet transmissions received by the receiving node from the transmitting node is a first SNR value and is a second data rate value larger than the first data rate value when said SNR value of packet transmissions received by the receiving node from the transmitting node is larger than said first SNR value, wherein the determined fragmentation threshold value is a first fragmentation threshold value at least when said SNR value of packet transmissions received by the receiving node from the transmitting node is a particular SNR value and is a second, larger fragmentation threshold value when said SNR value of packet transmissions received by the receiving node from the transmitting node is larger than said particular SNR value, and wherein the first and second fragmentation threshold values are based on the determined data rate value.

15. The apparatus of claim 14 wherein a fragmentation threshold value defines the frame length that, if exceeded by a frame at the transmitting node, results in partitioning of that frame into fragments that are to be independently transmitted to the receiving node, the length of the fragments being no greater than said frame length.

16. The apparatus of claim 14 wherein said computer readable program code is further such that when it is executed by the processor, the transmitting node is caused to transmit packet transmission frames to the receiving node at the determined data rate and using the determined fragmentation threshold value in said partitioning.

17. The apparatus of claim 14 wherein said computer readable program code is further such that when it is executed by the processor, the receiving node is caused to provide the determined fragmentation threshold value and data rate value to the transmitting node.

18. The apparatus of claim 14 wherein the combination is such as to maximize goodput between the transmitting node and the receiving node.

19. The apparatus of claim 14 wherein the combination is such as to maximize throughput between the transmitting node and the receiving node.

20. The apparatus of claim 14 wherein the combination is such that delay constraints are satisfied at the transmitting node.

* * * * *